No. 665,959. Patented Jan. 15, 1901.
S. D. FLOOD.
GAS COMPRESSING MACHINE.
(Application filed Feb. 18, 1898.)
(No Model.)
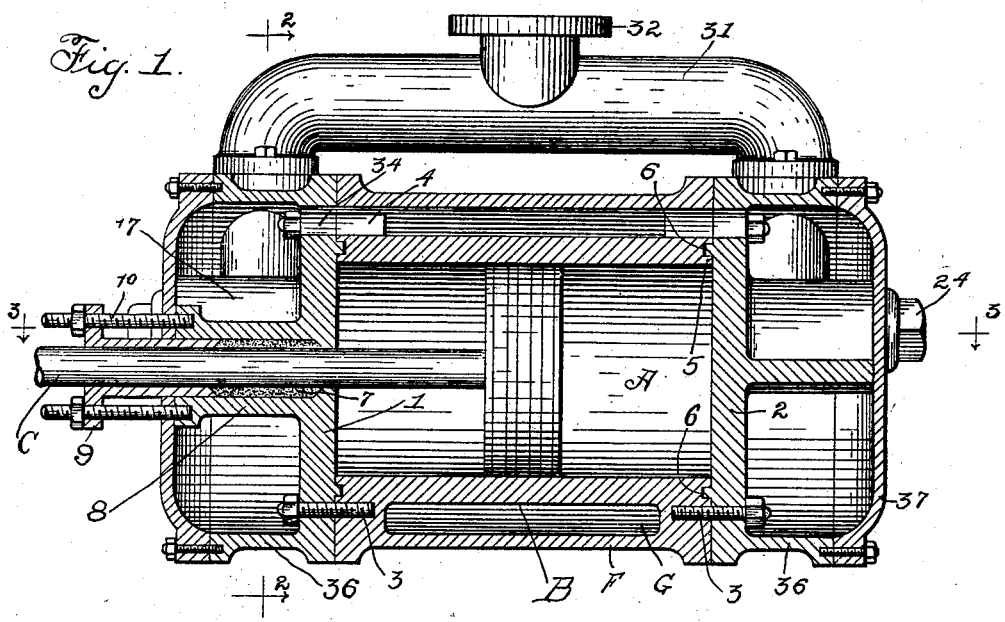
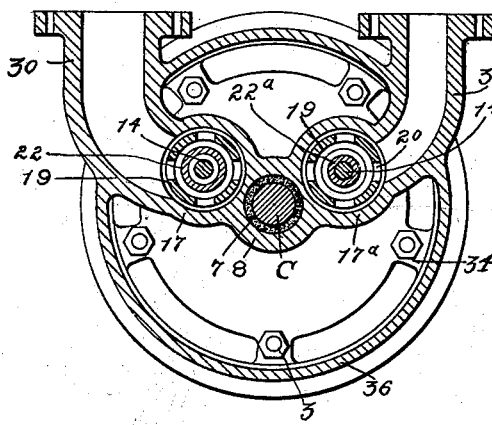
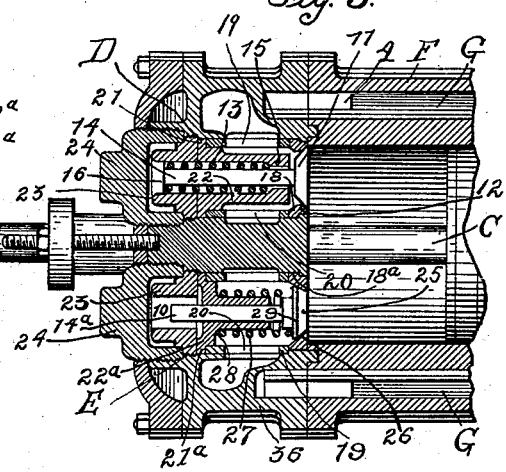
Witnesses:
Milton M. Alexander
Max W. Zabel
Inventor.
Samuel D. Flood,
By A. Miller Belfield
Attorney.

UNITED STATES PATENT OFFICE.

SAMUEL D. FLOOD, OF CHICAGO, ILLINOIS, ASSIGNOR TO THE A. H. BARBER & COMPANY, OF SAME PLACE.

GAS-COMPRESSING MACHINE.

SPECIFICATION forming part of Letters Patent No. 665,959, dated January 15, 1901.

Application filed February 18, 1898. Serial No. 670,758. (No model.)

*To all whom it may concern:*

Be it known that I, SAMUEL D. FLOOD, a citizen of the United States of America, and a resident of Chicago, county of Cook, and State of Illinois, have invented certain new and useful Improvements in Gas-Compressing Machines, of which the following is a specification.

My invention relates generally to gas-compressing machines, and particularly to a gas-compressing machine designed more especially for compressing exceedingly tenuous and penetrating gases, such as ammonia, and involving in its construction a cylindrical piston-chamber and a piston reciprocating therein and operating to compress the gas, a gas suction and discharge valve arranged at each end of the piston-cylinder and adapted to permit the gas to be admitted to and discharged from the opposite ends of the cylinder in alternation, and a water-jacket surrounding the piston-cylinder and providing a jacket-chamber in which water can be confined or circulated, so as to prevent the heating of the piston-cylinder and the gas while the latter is undergoing compression.

The prominent objects of my invention are to absolutely prevent leakage of the gas from the piston-chamber; to permit the use, operation, and handling of the machine by unskilled and ignorant persons unfamiliar with machinery without injurious results to the machine; to secure the maximum cooling effect possible by the use of water-jackets; to permit the removal, repair, and replacement of the valves without having to preliminarily remove the water-jacket casing or otherwise dismember the machine to any considerable extent; to provide novel features of construction tending to increase the efficiency and utility of compressing-machines, and to secure the above results in a practical, inexpensive, and simple manner.

To the attainment of the foregoing and other desirable ends my invention consists in matters hereinafter fully set forth.

In the following drawings, Figure 1 is a vertical section taken centrally through the piston-cylinder of a gas-compressing machine embodying my invention. Fig. 2 is a transverse vertical section taken on line 2 2 in Fig. 1. Fig. 3 is a portion of a horizontal section taken on line 3 3 in Fig. 1.

In the machine a portion of which I have illustrated the reciprocating piston A is reciprocated within the piston-cylinder B, through the medium of a suitable piston-rod C, by any suitable power mechanism. This could of course be a steam-engine or a crank or any other well-known form of device for producing a reciprocating motion. The heads 1 and 2 of the piston-cylinder B are bolted to the latter by means of suitable bolts 3 3, extending through the heads and into the ends or into suitable ears 4 4, formed at the ends of the piston-cylinder. These heads 1 and 2 could be joined to the ends of the piston-cylinder in any desirable way and could be packed so as to prevent to a greater or less extent the escape of the gas from the piston-chamber also in any desirable way. As a matter of further improvement, however, they are joined to the ends of the cylinder by means of annular ribs or beads 5, extending inwardly from their inner surfaces and fitting in annular recesses in the ends of the cylinder. Between the inner faces of the beads 5 and the annular recesses in which they fit are arranged packing-rings 6, which fit closely into annular recesses and are compressed therein by the pressure exerted upon them in securing the heads 1 and 2 to the ends of the cylinder. This construction provides an exceedingly simple and highly efficient arrangement for fitting the heads 1 and 2 to the ends of the cylinder and at the same time practically prevents absolutely any escape of the gas from the piston-chamber provided by the piston-cylinder B.

The piston-rod C is packed by means of packing 7, which is arranged in a suitable stuffing-box 8, formed integral with and extending outwardly from the cylinder-head 1 and is held therein by a gland 9, which fits into the bore of the stuffing-box 8 and is secured in position by bolts 10.

The ammonia or other gas which is compressed by the machine is admitted to and discharged from the opposite ends of the cylinder in alternation by suitable valves, which are arranged and adapted to allow it to be drawn into one end while it is being discharged from the other, and vice versa. I could employ any suitable form of suction and discharge valve for this purpose. The valves shown in the drawings are of a simple and efficient construction; but they form no part of my present invention. They are shown merely to illustrate a complete and operative machine. It will be observed that although Fig. 3 is a section of but one-half of the cylinder it will be understood that the valves at the opposite end are identical with those shown in this figure. A suction and discharge valve is arranged at each end of the cylinder on either side of a median longitudinal line. The suction-valve D involves an outwardly-tapered or conical valve proper, 11, which is seated upon a correspondingly-tapered or conical valve-seat 12 and is capable of being reciprocated or lifted from its seat in a direction into the end of the cylinder, so as to allow the gas to pass into the latter when the piston is receding from it. The valve 11 is held normally against its seat 12 by a compression-spring 13, which incloses a spindle 14, carrying the valve 11, and which has one of its ends acting against a seat 15 and the other acting against the shoulder formed by a head 16 at the outer end of the spindle 14. In order to prevent the head 16 from working loose or becoming detached from the spindle 14, it is made integral therewith, in which way the possibility of the valve 11 working into the piston-chamber and interfering with the piston, and thereby causing a breakage of the machine, is absolutely prevented. This inwardly-opening valve mechanism is confined and operates within a valve-chamber provided by a substantially cylindrical valve-casing 17, which is desirably made integral with and extends outwardly from the cylinder-head I.

In order to permit the bodily removal of the valve 11 and its coöperating parts, so as to permit the repairing or replacement thereof without necessitating the removal of the cylinder-head I, the valve-seat 12 for the valve 11 is provided by a bodily-removable collar 18, which is fitted in the forward end of the valve-casing 17. This removable collar 18 is held normally in position at the forward end of the valve-casing by means of a sleeve or cage 19, which fits against the rear face of the collar 18 and is provided with longitudinal slots 20, which allow the ammonia or other gas to pass into the interior of the valve-chamber. The sleeve 19 is in turn held normally in position against the collar 18 by a shoulder 21 at the end of a second sleeve 22, which extends forwardly within the sleeve 19 and has its forward end made so as to provide the seat 15 for the compression-spring 13. This sleeve 22 is made in two longitudinal parts or is longitudinally split, so that it can be placed over the spindle 14 when the head 16 and valve 11, carried thereby, are made integral therewith or incapable of being detached therefrom. This sleeve 22 is in turn held in position by a threaded nut 23, which is screwed into the valve-casing 17, so as to fit against the rear face of the sleeve 22, and which has a bore adapted to permit the head 16 on the spindle 14 to work therein. It is in turn held in place by a threaded plug 24, which screws into the outer end of the valve-casing 17 and has its forward end fitted against a shoulder formed in the threaded nut 23.

The discharge-valve mechanism E involves an outwardly flared or tapered valve proper, 25, which fits against a correspondingly flared or tapered conical valve-seat 26, in which way the valve can open outwardly or away from the cylinder, so as to permit the ammonia or other gas to be discharged from the latter when the piston is moving toward it. The valve 25 is held normally against its valve-seat 26 by a compression-spring 27, whose forward end acts against a seat 29, formed at the rear of the valve 25, and whose rear end acts against a seat 28, formed near the rear of a split sleeve $22^a$, which incloses the valve-spindle $14^a$. The valve-seat 26 is provided by a removable collar $18^a$, positioned at the forward end of the valve-chamber. The collar $18^a$ is held in position by a slotted sleeve 19, a split sleeve $22^a$, a threaded nut 23, and a threaded plug 24.

Ammonia or the like is admitted to the valve-chamber provided by the valve-casing 17 by way of a port 30 and is discharged from the valve-chamber provided by the valve-casing $17^a$ by way of the port $30^a$. These ports 30 and $30^a$ extend upwardly and outwardly from the valve-casings 17 and $17^a$ and thence upwardly to points above the top of the cylinder B and are desirably made integral with the cylinder-head I. Ammonia is admitted to the port 30 and to the corresponding port for a similar valve at the other end of the cylinder by an inlet-pipe 31 and is discharged from the port $30^a$ and from a corresponding port at the opposite end of the cylinder by an outlet or discharge pipe. (Not shown in the drawings, but corresponding to the inlet-pipe 31.) The inlet-pipe 31 and the outlet-pipe similar thereto extend longitudinally above the cylinder and have their ends bolted to the upper ends of the inlet and outlet ports 30 and $30^a$, respectively, it being understood that the suction and discharge valves at the end of the cylinder, but not shown in the drawings, are on the same sides thereof as the valves D and E, in which way the inlet and outlet pipes extend parallel to one another on opposite sides of the cylinder. The inlet-pipe 31 receives ammonia or like gas by way of a single orifice 32, arranged at its longitudinal middle and provided with a flange by which it can be connected with a suitable supply-pipe. The discharge-pipe is similarly constructed, so that it can be connected with a suitable exhaust-pipe. As a matter of further improvement practically the entire gascontaining mechanism is completely water-jacketed. As a simple arrangement the cylinder B is surrounded by a cylindrical casing F, which provides between itself and the outside of the cylinder a jacket-chamber G. This casing F is held in position outside of the cylinder B by means of laterally-extending webs 34, which also provide portions into which the bolts 3 3 can be screwed.

The cylinder surrounding casing F is, in effect, extended longitudinally in both directions by cylindrical flanges 36, made integral with the cylinder-heads 1 and 2 and adapted to fit against the opposite ends of the casing F. Jacket-heads 37 37 are fitted to the outer ends of the flanges 36 36 and are held in place thereagainst by suitable screws. These heads 37 37 fit closely against the ends of the valve-casings 17 and 17ª and are provided with suitable threaded holes, into which the threaded plugs 24 24 can be screwed. It will be seen that by this construction the machine is provided with a jacket-casing which contains all of its gas-chambers—that is to say, the compression-chamber and valve-chambers and the ends of the ports leading thereto—and which provides a jacket-chamber that completely surrounds the compression-chamber. It will be further seen that the valve-chambers are accessible from outside of the jacket-casing when the latter is in place, in which way the valve mechanisms can be bodily removed from their chambers without necessitating a preliminary removal of the jacket-casing.

What I claim is—

1. The combination with a cylinder and the heads thereof; of a circumferentially-arranged jacket extending beyond and inclosing both ends of the cylinder and provided with jacket-heads; valve-casings arranged in the end portions of the jacket and extending between the cylinder-heads and the jacket-heads; devices, such as caps, extending through the jacket-heads and fitting the ends of the valve-casings; and ports extending from the valve-casings to and through the jacket.

2. The combination with the cylinder and the cylinder-heads therefor, of a jacket surrounding the same, and constructed with detachable jacket-heads; valve-casings made integral with the cylinder-heads, and extending substantially to the jacket-heads; and caps fitted within apertures in the jacket-heads, and also into the outer ends of the valve-casings.

Signed by me at Chicago, Illinois, this 16th day of February, 1898.

SAMUEL D. FLOOD.

Witnesses:
A. MILLER BELFIELD,
L. A. GARDINER.